UNITED STATES PATENT OFFICE.

WILLIAM HEAP, OF STOCKPORT, AND EDGAR NEWBERY, OF MANCHESTER, ENGLAND.

MANUFACTURE OF METALLIC CHLORIDS.

1,331,257. Specification of Letters Patent. Patented Feb. 17, 1920.

No Drawing. Application filed August 26, 1918. Serial No. 251,549.

*To all whom it may concern:*

Be it known that we, WILLIAM HEAP and EDGAR NEWBERY, subjects of the King of Great Britain, residing at Stockport, in the county of Chester, and Manchester, in the county of Lancaster, both in the Kingdom of England, respectively, have invented certain new and useful Improvements in the Manufacture of Metallic Chlorids, of which the following is a specification.

The present invention relates to improvements in the manufacture of metallic chlorids especially such as are difficult to obtain in the anhydrous form, such as those of aluminium, magnesium, cerium and other rare earth metals.

We treat the oxid, the carbonate, the oxalates or other salts of the metal containing very weak organic acids with a mixture of producer gas and chlorin, the producer gas being obtained without the use of water in the furnace. The temperature required varies with each salt and each oxid more or less and therefore it is difficult to give it except by example as hereinafter set forth.

The great advantage of this method lies in the cheapness of producer gas as a source of carbon monoxid, and we have found that contrary to expectation, the dilution of this carbon monoxid with the nitrogen of the air exerts no deleterious effect upon the process.

An advantage of this method is, that whereas many chlorids such as magnesium or aluminium chlorid are very difficult to prepare in the anhydrous form, the products obtained according to the present invention are completely anhydrous and also free from carbon.

A further application of this method lies in the dehydration of hydrated chlorids previously prepared by other methods. If the hydrated chlorid be heated with phosgene, with chlorin and carbon monoxid, or with chlorin and producer gas, we have found that the water is removed and that the formation of basic compounds is completely prevented. These reactions are general. They have been found particularly useful for magnesium, aluminium, calcium, and iron chlorids and the chlorids of the cerium group of rare-earth metals and it is believed that hardly any metallic oxid can withstand the action of the gases described if the requisite temperature can be attained without previous decomposition of the oxid.

As an illustration of working our invention, the following is the description for making the mixed anhydrous chlorids of the cerium group of rare earth metals.

The crude oxid or the hydrated chlorid is placed in a thin layer in a tube or any other convenient apparatus and heated to a temperature of 650° C. A mixture of dry producer gas (preferably made without steam) and chlorin is then passed over until the whole is changed in color from brown to white. This white substance is the anhydrous chlorid. The relative proportions of producer gas and chlorin are adjusted so that the volume of the chlorin is equal to the volume of the carbon monoxid in the producer gas. Other chlorids may be produced in the same manner but different temperatures are required for other oxids. If the temperature be allowed to rise too high, fusion of the partly formed chlorids occurs which prevents the further action of the gases. In most cases where a mixture of gases is used the employment of a catalyst such as animal carbon for the production of phosgene is useful, but the catalyst should be placed in a vessel or other position over which the gases pass before they strike the oxid or hydrated salt in order to prevent the catalyst being mixed with the finished product.

We declare that what we claim is:—

1. The process of manufacturing anhydrous metallic chlorids which includes the step of heating a metallic compound in presence of a mixture of chlorin and producer gas substantially free from hydrogen.

2. The process of manufacturing anhydrous metallic chlorids which comprises heating an oxid or hydrate of a metal in presence of a mixture of chlorin and producer gas substantially free from hydrogen.

3. The process of manufacturing anhydrous chlorids of rare metals of the cerium group which comprises heating a compound of such metal in presence of a mixture of chlorin and producer gas substantially free from hydrogen.

In witness whereof, we have hereunto signed our names this 23d day of July, 1918, in the presence of two subscribing witnesses.

WILLIAM HEAP.
EDGAR NEWBERY.

Witnesses:
W. H. BEESTON,
J. MCLACHLAN.